March 21, 1944.   J. E. ESHBAUGH ET AL   2,344,685
DIRECTIONAL SIGNAL SWITCH
Filed Aug. 4, 1941

Inventors
Jesse E. Eshbaugh &
Charles W. McKinley
Attorneys

Patented Mar. 21, 1944

2,344,685

UNITED STATES PATENT OFFICE 2,344,685

DIRECTION SIGNAL SWITCH

Jesse E. Eshbaugh and Charles W. McKinley, Flint, Mich., assignors to General Motors Corporation, Detroit, Mich., a corporation of Delaware Application August 4, 1941, Serial No. 405,282

8 Claims. (Cl. 200—59)

Our invention relates to a direction signal switch of the type used on motor vehicles.

It has long been appreciated by the industry that some sort of signaling system is desirable which permits the vehicle operator to signal to others his intentions as to turning right or left without the necessity of extending his hand outside the vehicle. It is desirable that a system of this type require a minimum of attention on the part of the operator. To this end we have devised a direction signal switch which is automatically returned to the switch off position after the turn has been made.

An object of our invention is to provide a direction signal switch which may readily be installed on existing vehicles not provided with a direction signal system. The switch of our invention is simple and inexpensive to manufacture.

A further object of our invention is to provide a direction signal switch which is automatically returned to the switch off position after the turn has been made. This is accomplished by providing a flexible extension on the operating handle which is engaged by the spokes of the wheel.

Figure 1:
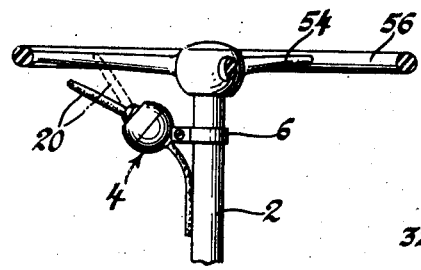
Figure 1 is a view of a steering wheel and column of a motor vehicle showing our invention in place.

Referring to the drawing in detail, 2 indicates the steering column of a motor vehicle to which our switch 4 is fastened by a clamp 6.

Figure 3:
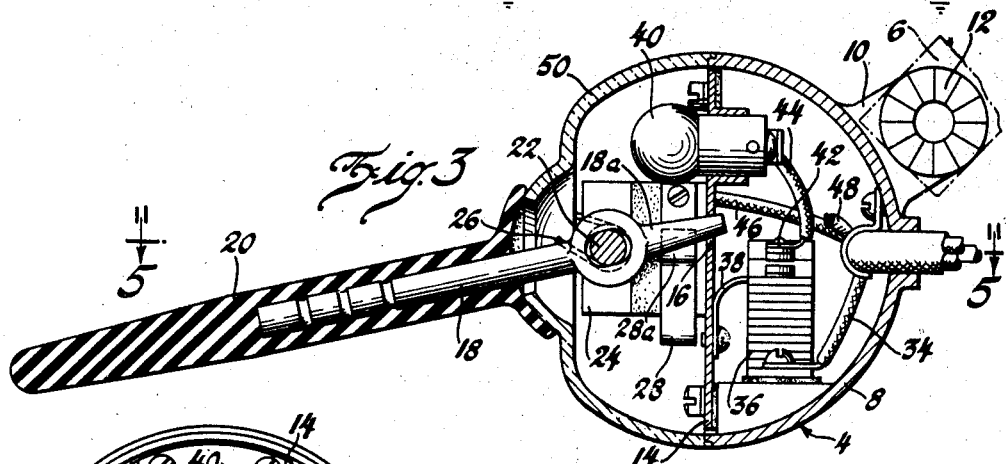
Figure 3 is a view in section substantially on line 3—3 of Figure 5.
Figure 4:
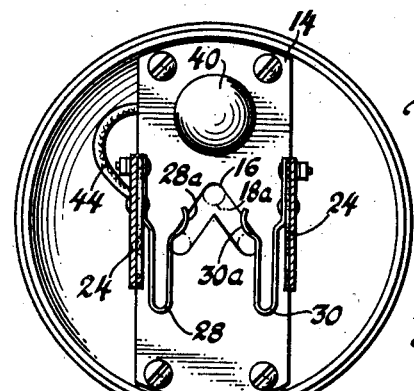
Figure 4 is a view with the switch cover removed and with parts broken away.
Figure 5:
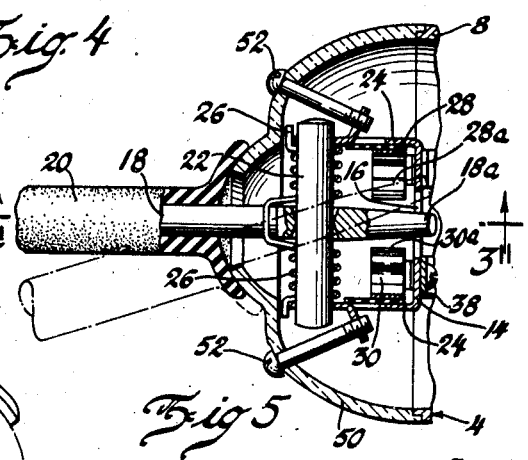
Figure 5 is a view in section substantially on line 5—5 of Figure 3.
Figure 6:
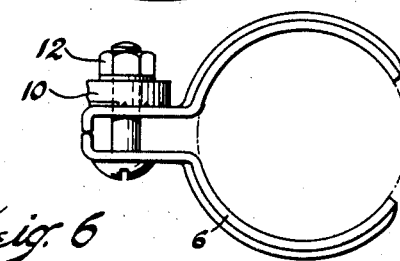
Figure 6 is a view showing details of the clamp which holds our switch to the steering column.

Our switch is contained in a casing 8 having an ear 10 which is secured to clamp 6 by a nut and bolt assembly 12 indicated in Figures 3 and 6. Suitably secured in casing 8 and insulated therefrom is a terminal or conductor plate 14. As will be explained further on, terminal or plate 14 is connected to a source of electrical potential.

An inverted V-shaped slot 16 is provided in plate 14. A handle or control member 18 of a conducting material, having an extension 20 of any suitable resilient non-conducting material, such as rubber, is loosely pivoted on a pin 22 held in place by a bracket 24. A helical spring 26 is provided to bias handle 18 toward its neutral position. The inner end 18a of handle 18 engages slot 16. Spring contacts 28 and 30 are insulatably mounted on terminal 14 near slot 16. The ends are bent inward as at 28a and 30a to engage end 18a to hold handle 18 in either operative position against the bias of spring 26.

Figure 2:
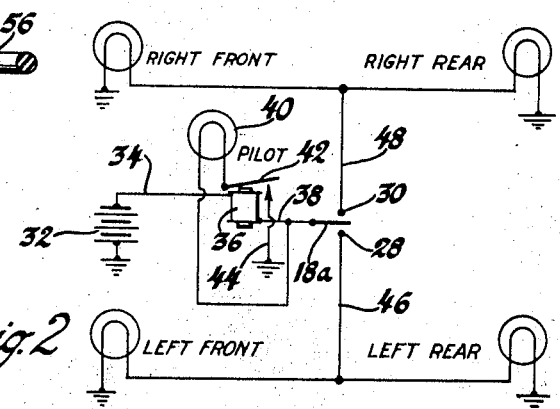
Figure 2 is a circuit diagram of a direction signal system embodying the switch of our invention.

Referring now to Figures 2 and 3, it is seen that a suitable source of electrical energy such as a storage battery 32 is provided. A conductor 34 connects battery 32 with a relay 36. This relay may be an ordinary solenoid or, if desired, may be an intermittently operated electromagnet such as a flasher. A conductor 38 connects relay 36 with terminal 14. Pilot light 40 contacts plate 14 through its socket base. The center contact of lamp 40 is grounded through solenoid operated switch 42 and conductor 44. Conductor 46 connects fixed contact 28 with the left signal lights, and conductor 48 connects fixed contact 30 with the right signal lights. A light transmitting cover 50 of an insulating material is held in place by screws 52.

The operation of our direction signal switch is as follows: If the operator desires to make a right turn, he manipulates operating handle 18 by means of extension 20 diagonally up and to the right or clockwise with reference to the steering wheel into the position shown in dotted lines in Figure 1. In this position the end 18a of operating handle 18 contacts conductor plate or terminal 14 and spring contact 30. Since handle 18 is itself an electrical conductor, a circuit is completed from conductor plate 14 to contact 30 and thence to the right signal lights. As the driver of the vehicle turns the wheel clockwise for the right turn, the spokes 54 of steering wheel 56 merely rub over extension 20 which is flexible and yields under the pressure of each spoke. The position of operating handle 18 is not changed by this clockwise rotation of wheel 56 because the spokes rub against extension 20 in the same direction as the general inclination of handle 18 and extension 20. However, after the turn has been made, wheel 56 is turned counterclockwise to straighten out the front wheels. Spokes 54 then come against extension 20 from the opposite direction and push extension 20 and operating handle 18 back to the neutral position shown in the drawing. The operation for a left turn is similar, the handle being moved diagonally up and to the left or counterclockwise with reference to the steering wheel.

We claim:

1. A direction signal switch comprising a casing, a terminal mounted in the casing, a slot of an inverted V-shape in the terminal, a contact mounted adjacent the slot and insulated from the terminal, an electrically conducting bridge member to complete a circuit from the terminal to the contact, said bridge member engaging said slot and being guided thereby, and a resilient handle on the bridging member.

2. In combination, a casing, a voltage carrying terminal in the casing, a slot of inverted V-shape in the terminal, a spring biased contact mounted adjacent the slot and insulated from the terminal, a conductor member pivotally mounted in the casing and having one end engaging the terminal slot, and handle means for pivoting said conductor member into engagement with said contact to complete a circuit from the terminal to the contact, said conductor member being in circuit closing position when it engages the lower end of either branch of the inverted V-slot.

3. A direction signal switch including a casing, a terminal plate mounted in said casing, a slot of substantially inverted V-shape in said terminal plate, relatively fixed contacts positioned in said casing adjacent the spaced lower ends of said slot and insulated from said terminal plate, and a relatively movable contact member engaging within said slot and adapted to complete a circuit from said terminal plate to one of said contacts on movement of said contact member to a position adjacent one of the lower ends of said slot.

4. The elements set forth in claim 3 in which said movable contact member is loosely pivoted to said casing and is provided with an operating handle extending outside of said casing.

5. The elements set forth in claim 3 in which spring means is associated with said movable contact member to bias said member to the upper end of said slot with said member spaced from both of said relatively fixed contacts.

6. The elements set forth in claim 3 in which spring means is associated with said movable contact member to bias said member to the upper end of said slot with said member spaced from both of said relatively fixed contacts, and each of said relatively fixed contacts includes yielding means to hold said movable contact member in engagement with the respective contact against the bias of said spring means when said contact member is moved to a position adjacent one of the lower ends of said slot.

7. A direction signal switch including a casing, a movable switch operating handle extending from said casing, means to mount said handle in said casing and limit the movement of the outer end thereof to a relatively fixed V-shaped path, spaced relatively fixed contacts in said casing, and a movable contact member on the inner end of said handle adapted to be engaged with one or the other of said contacts when said handle is moved upwardly and diagonally from its lower central position to one of its upper positions.

8. A direction signal switch adapted to be mounted adjacent a vehicle steering wheel including a casing, a movable switch operating handle having a yieldable portion on the outer end thereof, means to mount said handle in said casing and limit the movement of the outer end thereof to a relatively fixed V-shaped path, spaced relatively fixed contacts in said casing, a movable contact member on the inner end of said handle adapted to be engaged with one or the other of said contacts when said handle is moved upwardly and diagonally from its lower central position to one of its upper positions, and means to mount said switch so that said yieldable portion on said switch operating handle is below the plane of rotation of the vehicle steering wheel when said handle is in its lower central position and extends into the plane of rotation thereof in both of its upper positions.

JESSE E. ESHBAUGH.
CHARLES W. McKINLEY.